(12) United States Patent
Shimamoto et al.

(10) Patent No.: US 7,817,917 B1
(45) Date of Patent: Oct. 19, 2010

(54) SYSTEM AND METHOD FOR MONITORING TELECOMMUNICATIONS EQUIPMENT

(75) Inventors: Andrew Y. Shimamoto, Kansas City, MO (US); Doug R. Greer, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1844 days.

(21) Appl. No.: 10/887,130

(22) Filed: Jul. 8, 2004

(51) Int. Cl.
*H04B 10/08* (2006.01)

(52) U.S. Cl. .............. 398/37; 398/38; 398/28; 398/25; 398/20

(58) Field of Classification Search .......... 398/37, 398/38, 5, 135
See application file for complete search history.

(56) References Cited

U.S. PATENT DOCUMENTS

| | | | |
|---|---|---|---|
| 6,337,764 B1 * | 1/2002 | Yoon et al. ............ 359/341.41 |
| 6,701,087 B2 * | 3/2004 | Beine et al. .................... 398/38 |
| 7,003,414 B1 * | 2/2006 | Wichelman et al. ........... 702/76 |
| 7,096,176 B1 * | 8/2006 | Hess ............................ 703/21 |
| 7,197,210 B2 * | 3/2007 | Elbers et al. ................... 385/39 |
| 2002/0159135 A1 * | 10/2002 | Kelkar et al. ............. 359/337.1 |
| 2003/0035203 A1 * | 2/2003 | Shlifer et al. ............ 359/337.1 |
| 2003/0133713 A1 * | 7/2003 | Ng et al. ........................ 398/37 |
| 2004/0240040 A1 * | 12/2004 | Tian et al. .................... 359/337 |
| 2005/0047781 A1 * | 3/2005 | El-Reedy et al. .............. 398/37 |
| 2006/0077534 A1 * | 4/2006 | Griggs et al. ................ 359/337 |

* cited by examiner

*Primary Examiner*—Ken N Vanderpuye
*Assistant Examiner*—Hibret A Woldekidan (57) ABSTRACT

The present invention provides a system and method for monitoring and providing settings to nodes in a telecommunications fiber network. The method and system reviews alarm and threshold settings of nodes and in the network. If the alarm and threshold settings a node are not within set standards, the standard alarm and threshold settings may be provided to the nodes. The method and system of the invention also calculates span loss between nodes in a telecommunications fiber network and the amplification levels of nodes in the network.

8 Claims, 8 Drawing Sheets

ALCATEL 1640S
SPAN LOSS PROBLEMS

SUMMARY REPORTS: SPAN LOSS | RULE OF 37 | LPTLVL/DRIVL VALIDATION
10D | 124C | 124D | 125C | 125D | 126C | 126D | 126E | 12C | 12D | 12F | 132D | 132E | 135E | 13E | 148A | 148B | 156A | 156B | 15A | 15B | 15C |
60D | 79E | 86C | 20D | 25E | 2D | 20C | 3E | 41C | 44C | 46C | 50E | 53C | 55C | 5D | 57D | 59C | 59D
17A | 187A | 19E | 19F | 20A | 20B | 88E | 8D | 90D | 90E | 91D | 91E | 9D

Route: 10D
902
ELPSTX87KWG-ALAITXROKR2 = 21.1
VHRNTXROKR3-TOYHTXROKR2 = 21.9
BRSWTXROKR2-PNWLTXROKR4 = 20.4
MDLDTXADKW8-SNTNTXROKR2 = 21
SNTNTXROKR2-WSBKTXROKR4 = 21.5
WSBKTXROKR4-SWTCTXROKR5 = 20
SWTCTXROKR4-ABLNTX06KR1 = 21.4
ABLNTX06KR1-CISCTXROKR4 = 20.1
CISCTXROKR4-SNTOTXROKR3 = 26.3
SNTOTXROKR3-FTWOTX52KWM = 26

Route: 124C
CHRLNCLEKWC-BRJTNCROKR3 = 26.1
BRJTNCROKR3-WNSLNCNMKR3 = 26.1
WNSLNCNMKR3-FONTVAROKR3 = 26.4

Route: 124D
CHRLNCLEKWE-BRJTNCROKR4 = 25.6
BRJTNCROKR4-WNSLNCNMKR4 = 25.6
WNSLNCNMKR4-FONTVAROKR4 = 25.6

Route: 125C
BNVSVAROKR3-MNSSVASPKR5 = 26.7
MNSSVASPKR5-WASHDC46KWE = 21.8

ELPSTX87KW9-LSCRNMROKR3 = 25.2
LSCRNMROKR3-RNCNNMROKR2 = 20.1
RNCNNMROKR3-ENGLNMABKR0 = 25.1
ENGLNMABKR0-SNANNMROKR3 = 27.2
BNDONMROKR3-ALBRNMROKW2 = 25.6

165A
Route: 15C

Route: 165A
CHCGILFFO1A-GURNILROKR5 = 26.7
GURNILROKR5-MLWWIZZOKR3 = 35
MLWWIZZOKR3-ICSNWIROKR1 = 21.7
ICSNWIROKR1-APPLWICZKW5 = 29.5
APPLWICZKW6-ASHWWIAUKR4 = 26.4
ASHWWIAUKR4-SHWNWIAHKR4 = 21.6
WAUSWIHIKR4-HULLWIADKR4 = 21.8
HULLWIADKR4-MRFDWTEKKR4 = 21.9
MRFDWIEKKR4-FRCHWIAAKR4 = 21
EUCLWIAHKR2-WDVLWIROKR5 = 21.2
WDVLWIROKR5-STPLMNIFKWH = 26.5

Route: 17A
HSTNTXHNKW8-HSTNTXIYKR1 = 21.4
HSTNTXIYKR1-KNFCTXROKR5 = 20.4
KNFCTXROKR5-BUMTTXCDKR1 = 21.4
BUMTTXCDKR1-DONCLAROKR5 = 21

KSCTMOECKWL-LESMMOEZKW2 = 20.8
LESMMOEZKW1-WRBGMOXAKR4 = 25.7
WRBGMOXAKR4-SYRCMOROKR4 = 21.7
GRSMMOROKR4-STLSMOVZKW0 = 29.2
STLSMOVZKW9-SPMNILROKR5 = 25.8
SPMNILROKR5-NLWDILROKR4 = 20.3
NLWDILROKR4-SPFDLUTKR1 = 21.3
SPFDLUTKR1-WSVLILROKR4 = 21.1
BLTNLLUTKR1-ODLILILROKR4 = 20.9
ODLILILROKR4-ELWDILROKR4 = 25.7
ELWDILROKR4-CHCGILPFKWQ = 26.8

Route: 57D
NSVLTN17KWN-CDHLTNROKR3 = 21.9
MDVKY22KR0-EVVLINAMKR4 = 25.8
VINCINACKR4-TRAHINUSKR4 = 25.4

Route: 59C
BLKNARROKR5-WYNNARROKR5 = 21.7
GBSNTNROKR5-RSSRTNROKR5 = 25.2
RSSRTNROKR5-MCWNTNROKR5 = 25.6
MCWNTNROKR5-NSVLTN17KWJ = 25.8

Route: 59D

SYSTEM AND METHOD FOR MONITORING TELECOMMUNICATIONS EQUIPMENT

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL HELD

The present invention relates generally to the field of computer software. More particularly, the invention relates to a method and system for monitoring telecommunications equipment. The method and system can highlight and monitor important relationships in telecommunications fiber network equipment that are not directly measurable.

BACKGROUND OF THE INVENTION

When a telephone call, Internet usage or other telecommunication is made, it is converted into a format, such as a laser or signal, that can be transferred across a fiber network. The signal is combined with other signals into a channel to make a composite signal. For example, a Sonet OC192 signal can have up to one hundred and thirty thousand calls per channel.

Figure 1:
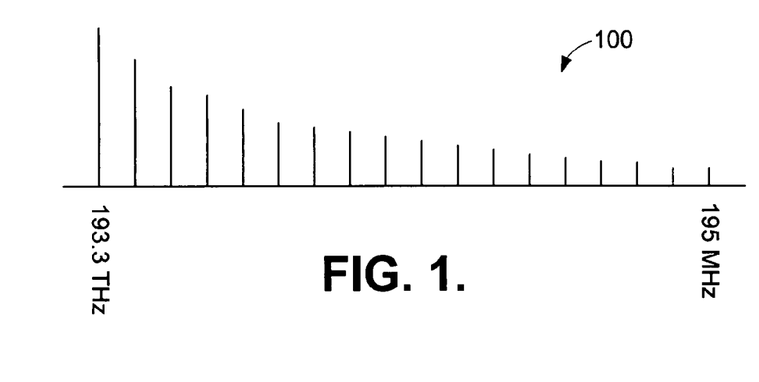
FIG. 1 is a schematic drawing of channels carried on a telecommunications fiber network for use in implementing the present invention.
Figure 2:
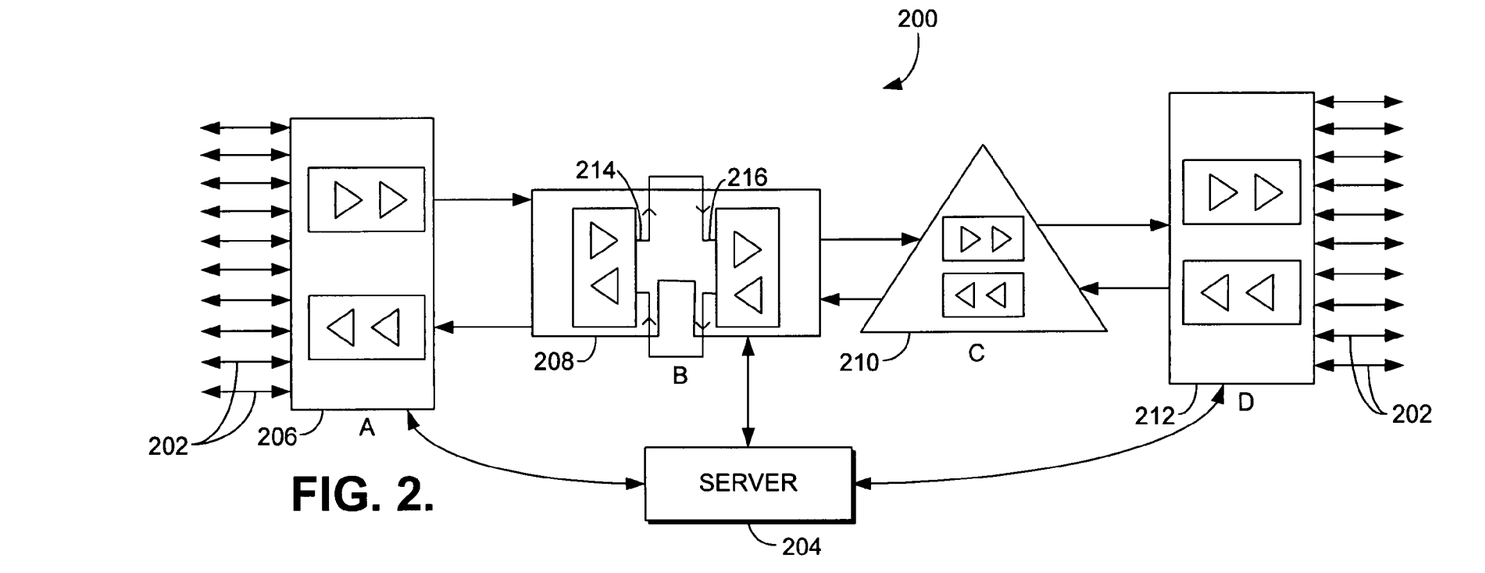
FIG. 2 is a diagram of a telecommunications network suitable for use in implementing the present invention.

As can be seen in FIG. 1, each fiber on the fiber network carries a number of channels 100. With reference to FIG. 2, if a composite signal is to be sent a distance, the channel enters a terminal node 206 and is sent along the fiber network 200 to another terminal node 212. As the signal passes across the fiber network it passes through other nodes, such as 208 and 210, to facilitate the transfer of the composite signal. For instance, the nodes can optically amplify the signal as it is transferred.

With reference to FIG. 2, a fiber network is shown. Channels 202 feed into the terminal nodes A and D, 206 and 212 respectively. The signals are transferred via the fiber network 200 and through nodes B and C, 208 and 210. If the equipment in the network is not provisioned correctly or monitored on a regular basis, there may be quality and performance degradation of the telecommunications signal, dropped calls and calls unable to be connected. To prevent these kinds of problems, changes often need to be made to the equipment, such as the nodes and terminal nodes, so that they operate within set standards. Furthermore, relationships between the equipment also need to be monitored. When monitoring and making changes to the equipment in a fiber network is done manually it is time consuming and costly. The completion of necessary changes to alarms and thresholds settings in the equipment manually can take years. Also, monitoring information such as span loss between equipment, total amplification and appropriate output power based on channel count currently is not done in the ALCATEL 1640 DWDM equipment in a telecommunications fiber network. As such, a method and system to monitor equipment and make changes to equipment in a telecommunications fiber network would be beneficial.

SUMMARY OF THE INVENTION

The present invention is described in detail below with reference to the attached drawing figures wherein:

In one embodiment, the present invention relates to a method of determining the span loss between two nodes in a telecommunications fiber network. The method includes determining the output power of a first node and determining input power of a second node. The method further includes determining span loss between the first and second node by determining the difference between the input power of the second node and the output power of the first node.

In another embodiment, the present invention relates to a method of determining whether optical fiber amplification of one or more nodes are close to optimal range. The method includes receiving input and output power of a node. The method further includes receiving mid-stage input and output power of the node. A first difference between the mid-stage input power and the mid-stage output power is determined. A second difference between the output power and the input power of the node is determined. The fiber amplification level of the node is determined by summing the first difference and the second differences.

In yet another embodiment, a method for determining the output power of a first node is provided. The method receives the channel settings for a node and determines the type of node. The method also determines the number of channels being used by the node based on the channel settings and determines the output power of the node based on the number of channels being used and type of node.

In still another embodiment, a method for providing alarm or static threshold settings to a node in an ALCATEL 1640 system is provided. The method includes receiving a set standard for one or more alarms or static thresholds. The method further includes determining whether a first node has alarm or static threshold settings that are within the set standard for the one or more alarms of static thresholds. If not, the set standard for the one or more alarms or static thresholds is provided to the first node.

BRIEF DESCRIPTION OF THE DRAWINGS

FIG. 9 is an exemplary screenshot of equipment in a telecommunications network exhibiting span loss problems in accordance with an embodiment of the present invention;

DETAILED DESCRIPTION OF THE INVENTION

The present invention provides a system and method for monitoring equipment in a telecommunications network. The present invention also provides a method and system for providing alarm and threshold settings to equipment in a telecommunications network.

With reference to FIG. 2, an exemplary telecommunications system for implementing the present invention is shown. The exemplary system includes terminals A and D, 206 and 212 respectively. The exemplary terminals A and D are the beginning and end nodes for signals sent long distances in a telecommunications fiber network. Channels 202 feed into terminals A and D, 206 and 212 respectively. As signals are sent through the telecommunications fiber network, they travel through nodes B and C, 208 and 210 respectively in a telecommunications fiber network. Exemplary nodes include ALCATEL 1640 DWDM equipment such as Immediate Line Amplifier (ILA) and Wavelength Add/Drop Multiplexer (WADM) and terminals. One skilled in the art will appreciate that there may be any number and type of nodes between Terminal A, 206 and Terminal D, 212. For instance, there may be multiple WADM and/or ILA nodes located between the terminals.

The present invention includes a server or other computing device 204 that has the capability of logging into all of the nodes in a telecommunications network. For example, the server 204 request and/or receives data from nodes A, B, C and D and provides settings and thresholds to the nodes. The server has the capability to communicate with the ALCATEL 1640 DWDM equipment using Telnet connection. One of skill in the art will appreciate that another connection may be used. The settings, thresholds and/or commands provided to the nodes by the server TL1 commands. The method and system of the present invention uses open source GNU General Public License (GPL) practical extraction and report language (PERL) modules from comprehensive PERL archive (CPAN) such as the Net: Telnet modules. Other modules may include the MLDBM module that deals with Berkley database files and the PROC::Queue module that creates a process queue.

Figure 3:
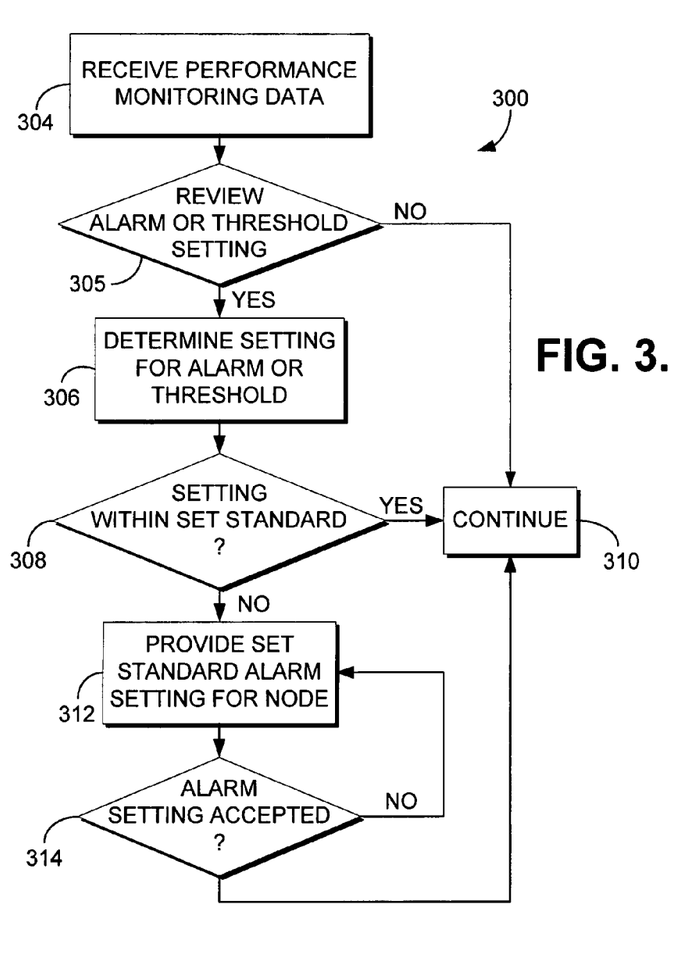
FIG. 3 is a flow diagram of a method for monitoring and providing alarm and threshold standards for equipment in a telecommunications network in accordance with an embodiment of the present invention.

With reference to FIG. 3, a method for determining alarm and threshold settings and providing alarm and threshold settings 300 in a telecommunications network is provided. The server establishes a connection with the node such that the server can receive information from the node and provide commands to the node. The server 204 can automatically establish a connection, receive data and provide commands on an automated schedule. In one embodiment, a series of scripts using PROCOMM PLUS are run on an ALCATEL 1640 system and issue TL1 commands to provision alarms or thresholds. Thresholds are software-configured points where the system generates an alarm based on the performance of the hardware. Static thresholds are thresholds that are always configures to the same value everywhere in the network according to set standards. Alarms are indications of degraded performance of the system. Alarms consist of two primary components; an indication of what is wrong and how severe that condition is. Thresholds and alarms can be used to identify degradation in performance before it impacts customers (drops voice calls.) At step 304, the system receives data from the node. This may include current alarm and threshold settings for the node, amplification power level data, input and output power levels, and any other data related to performance of the node. Optionally, at step 305 it can be determined whether alarm or threshold settings of one or more nodes should be reviewed. If not, the system continues at step 310.

If so, at step 306, the setting for one or more alarm or thresholds is determined from the performance monitoring data received at step 304. At step 308, it is determined whether the one or more alarm or threshold settings from the performance monitoring data of the node are within set standards. The set standard is what the alarm or threshold should be operating at. If so, the system continues at step 310. This process can be done for multiple nodes in the network.

If the alarm setting or threshold setting is not within the set standard specified to the server at step 312, the node is provided with the set standard alarm or threshold setting. In other words, the alarms and static threshold settings are re-provisioned to be within set standards. The method of the present invention allows for each node in the telecommunications network to be automatically reviewed for threshold or alarm settings and allows the necessary changes to be made. Each piece of equipment in the network can be automatically provisioned on an automatic schedule. This reduces the time to reprovision equipment in the network.

After providing the alarm and threshold settings for the node at step 314, it is determined whether the setting provided has been accepted by the node. If so, the system continues at step 310. If the alarm setting has not been accepted by the node, the system tracks this and returns to step 312 to provide the set standard alarm setting to the node until it is accepted. In other words, if the setting is not accepted, the system automatically retries to provide the setting. If the alarm setting is accepted at step 314, the system continues at step 310.

Figure 4:
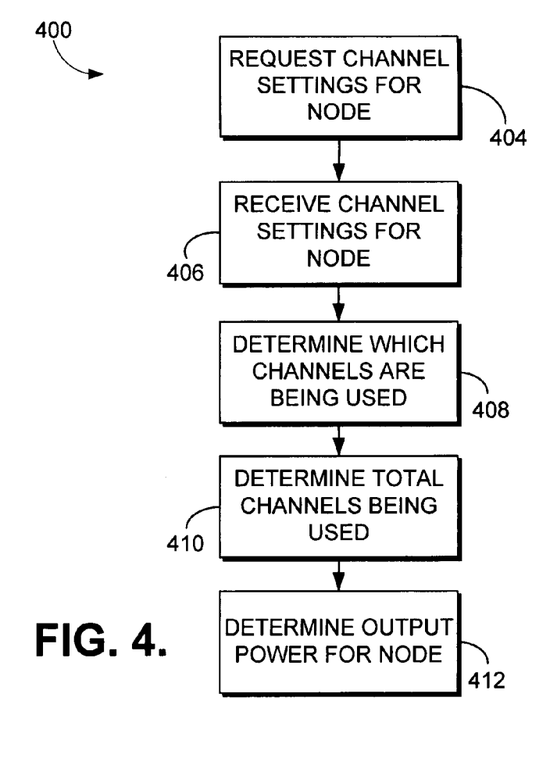
FIG. 4 is a flow diagram of a method for determining the output power for equipment on a telecommunications network in accordance with an embodiment of the present invention.

With reference to FIG. 4, a method for determining the output power of a node 400 is shown. The launch or output power of each node in along the fiber network can be determined. At step 404, the server requests channel settings for a node. The channel settings can be requested using TL1 commands such as "RTRV-OCH". At step 406, the system receives the channel settings for the node. At step 408, the channel settings are used to determine which channels are being used on the node. At step 410, the system determines the total channels being used by adding together the channels being used. At step 412 the system determines the output power for the node. This can be done by accessing a hash table or look up table for the specific type of node and locate the corresponding entry for the number of channels being used. This entry can be used as the output power for the node.

Figure 5:
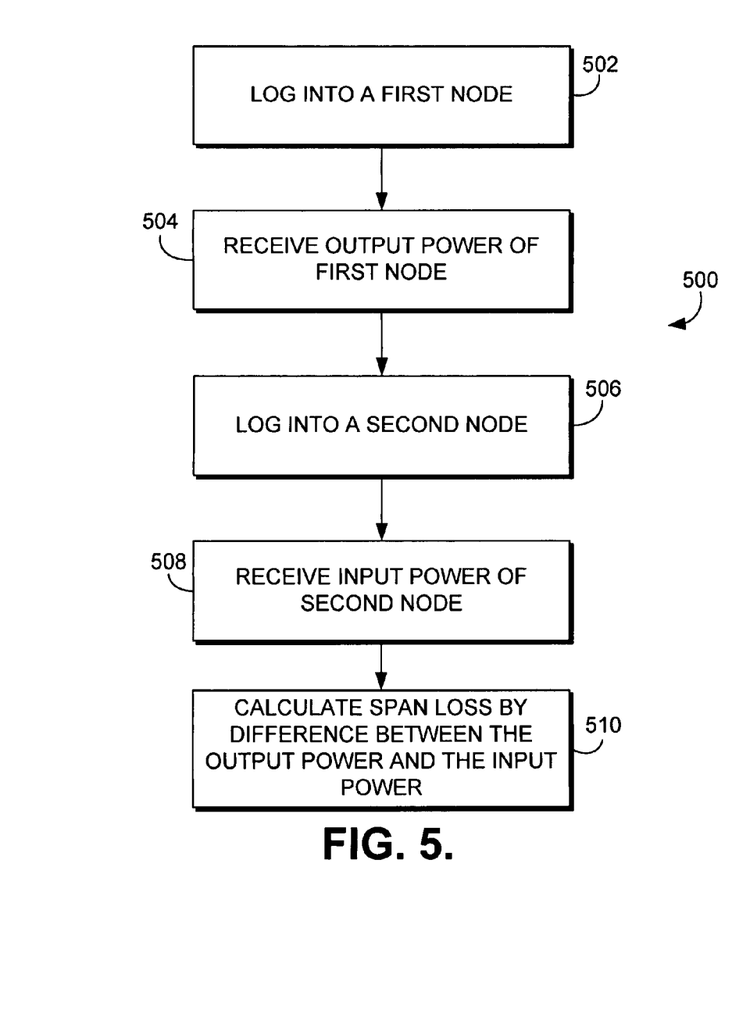
FIG. 5 is a flow diagram of a method for calculating the span loss between equipment in a telecommunications network in accordance with an embodiment of the present invention.

With reference to FIG. 5 at step 502, the server logs into a first node. At step 504, the system receives the output power of the first node. This can be determined as is shown in FIG. 4 or in any other variety of ways known to one skilled in the art. At step 506, the server logs into a second node. At step 508, the system receives the input power of the second node. This may be done by accessing a hash table for the specific type of equipment in determining what the input power is. At step 510, the span loss is calculated between the second and the first node by calculating the difference between the output power of the first node and the input power of the second node. Span loss is used to determine where and how much power is lost between two nodes and based on the loss if any adjustments need to be made to the equipment in the network.

For example, the span loss can be determined between the exemplary nodes 206 and 208 in FIG. 2. The span loss between nodes 206 and 208 can be determined. First the output power of the first node 206 is received. The input power of the second node 208 is also received. The difference between the input power of the second node and the 208 and the output power of the first node 206 is determined. This determination is the span loss between the two nodes. Because a signal can travel one of two ways along the fiber network 200, the span loss between nodes can be determined for either direction. In the above example, the span loss for the eastbound direction between nodes 206 and 208 was determined. The span loss for the westbound direction between nodes 206 and 208 can be determined using the output power of node 208 and the input power of node 206.

Figure 6:
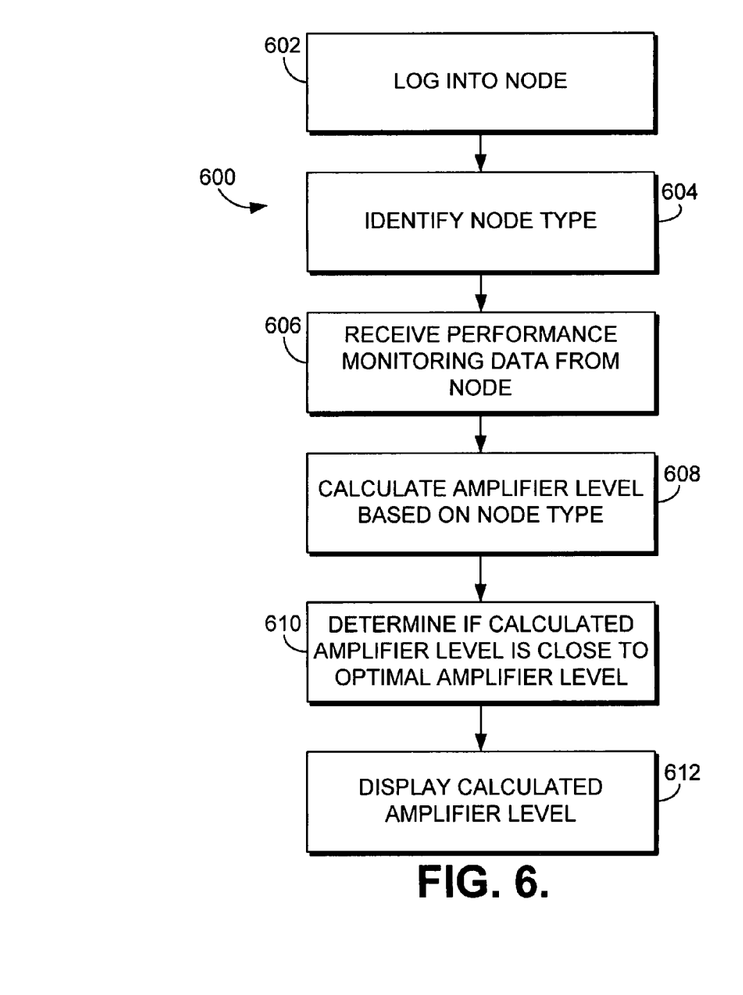
FIG. 6 is a flow diagram of a method for calculating amplification levels of equipment in a telecommunications network in accordance with an embodiment of the present invention.

With reference to FIG. 6, a method for determining whether the amplification level is close to the optimal amplification level for the node 600 is shown. If the amplification level is not close to the optimal amplification level, tilt problems will occur and the signals will be askew. At step 602, the system logs into the node. At step 604, the node type is identified. At step 606, the system receives performance monitoring data from the node. At step 608, the system utilizes the performance monitoring data to calculate the amplification level based on the node.

The optical fiber application (OFA) level for a node can be determined by receiving the input power for the node $P_{(IN)}$ and output power $P_{(Out)}$. The mid-stage input power $MSP_{(out)}$ and the mid-stage output power $MSP_{(IN)}$ of the node are also received. The OFA can be calculated using the following: $P_{(Out)} - P_{(IN)} + (MSP_{(out)} - MSP_{(IN)})$. In other words, the input power of the node is subtracted from the output power of the node to calculate a first difference. The mid-stage input power of the node is subtracted from the mid-stage output power the node to calculate a second difference. Then the sum of the first and second differences is determined as the OFA for the second node.

Following at step 610, the system determines if the calculated amplification level is close to the optimal amplification level for that specific node type. In the ALCATEL 1640 system the optimal amplification level is the rule of 37. Thus, the system would compare the calculated amplification level is close to the optimal amplification level of 37. For example, in some instances, a node that has an amplification level that is more than "3" away from 37 may be flagged as a node with an amplification level that needs to be modified. At step 612, the system displays the calculated amplifier level. This information can be used by a technician to see if any adjustments or modifications need to be made to the node or other equipment in the network.

The span loss, launch power and amplification levels of nodes in the fiber network can be displayed on a web page or another display. Furthermore, span loss, launch power and amplification levels that are determined to be outside of preferred levels can be flagged or highlighted in the display. PHP: Hypertext Preprocessor (PHP) scripts can be used create the web page.

Figure 7:
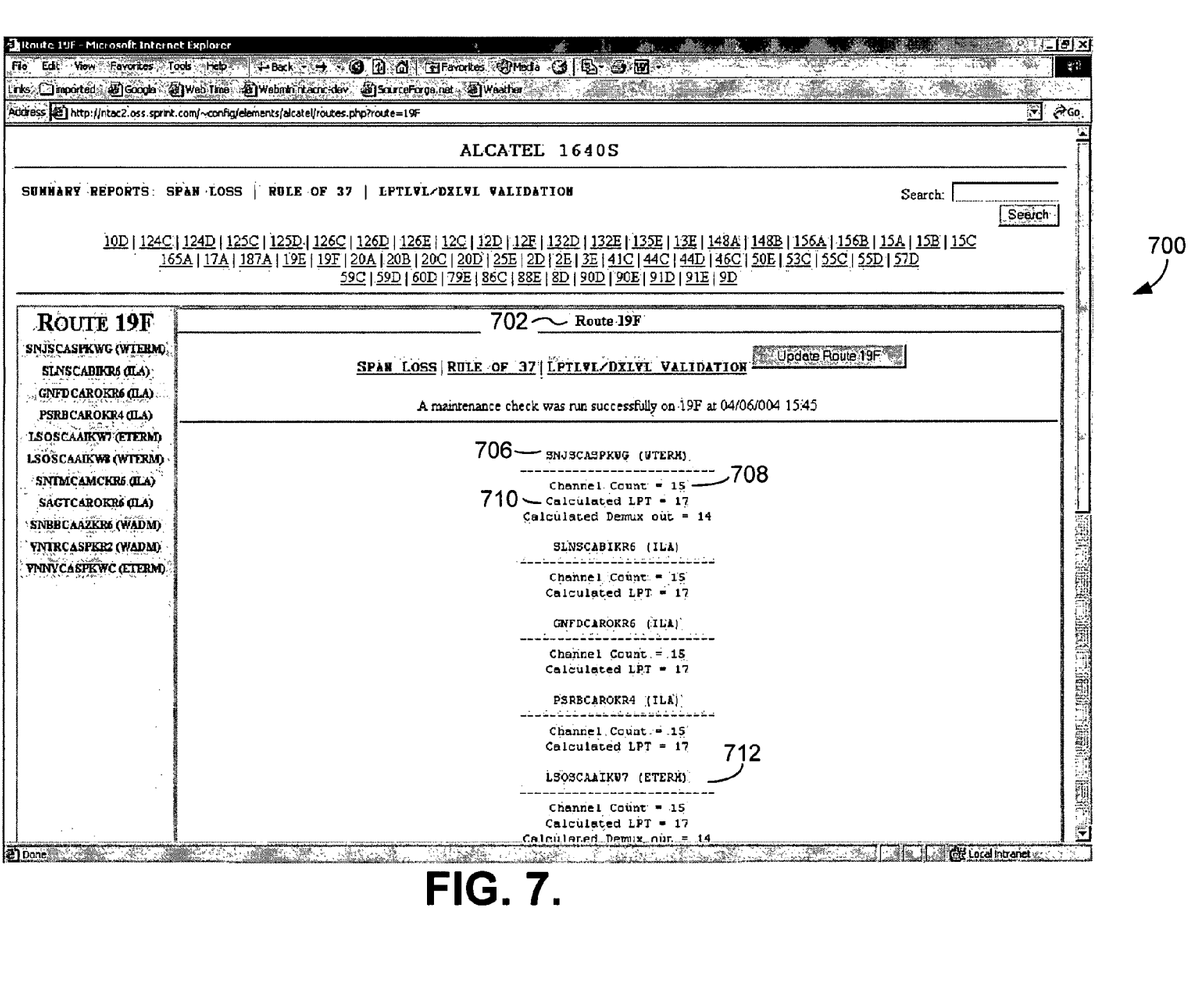
FIG. 7 is an exemplary screenshot of a display of output power of equipment in a telecommunications network in accordance with an embodiment of the present invention.

Referring next to FIG. 7, a screenshot of output power for particular node 700 is shown. In the exemplary screenshot, the output power is shown for nodes on route 19F 702 in the ALCATEL 1640 system. The output power for the western terminal 706 is shown. In this example, the calculated output power (LPT) is 17. There were 708 being used in the western terminal 706. The output power is also calculated for all the nodes along the route and the eastern terminal. The output power is calculated based on a channel count of 15 for all the nodes.

Figure 8:
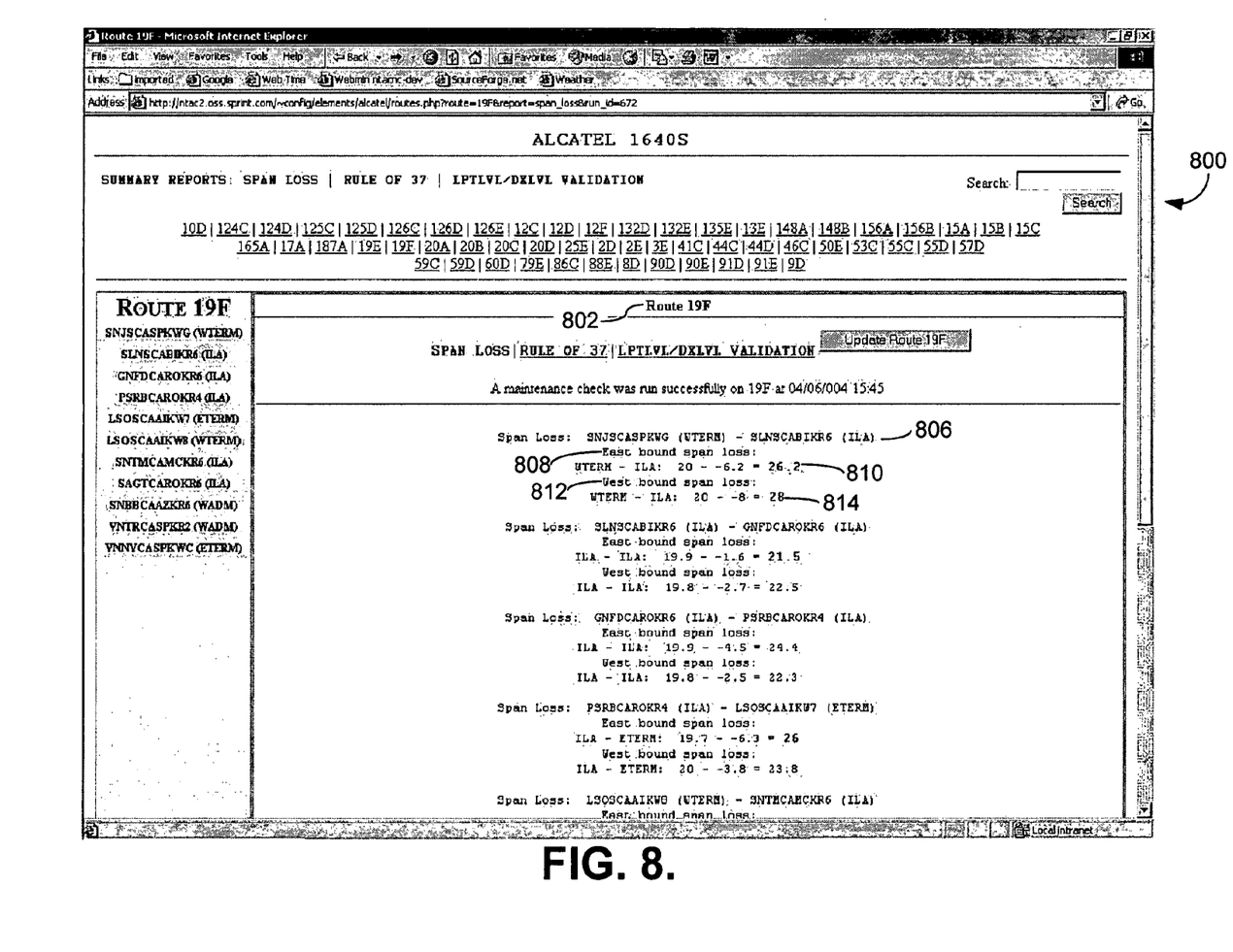
FIG. 8 is an exemplary screenshot of span loss determination between equipment in a telecommunications network in accordance with an embodiment of the present invention.

With reference to FIG. 8, an exemplary screenshot 800 showing the span loss for route 19F, 802 is shown. The screenshot shows the eastbound span loss 808 and the westbound span loss 812 for nodes on the route 19F, 802. For example, the span loss 806 between the western terminal and the ILA node is shown. The span loss going eastbound between the two nodes 810 is 26.2. The span loss going westbound 814 is 28. This is done for all adjacent nodes on the route.

With reference to FIG. 9, an exemplary screenshot 900 showing nodes having span loss problems in the ALCATEL 1640 system is shown. For example, in route 10D 902 there are 10 adjacent nodes 904 exhibiting span loss problems. This can be used so that a technician can identify nodes which need to be adjusted or where equipment may need to be added.

Figure 10:
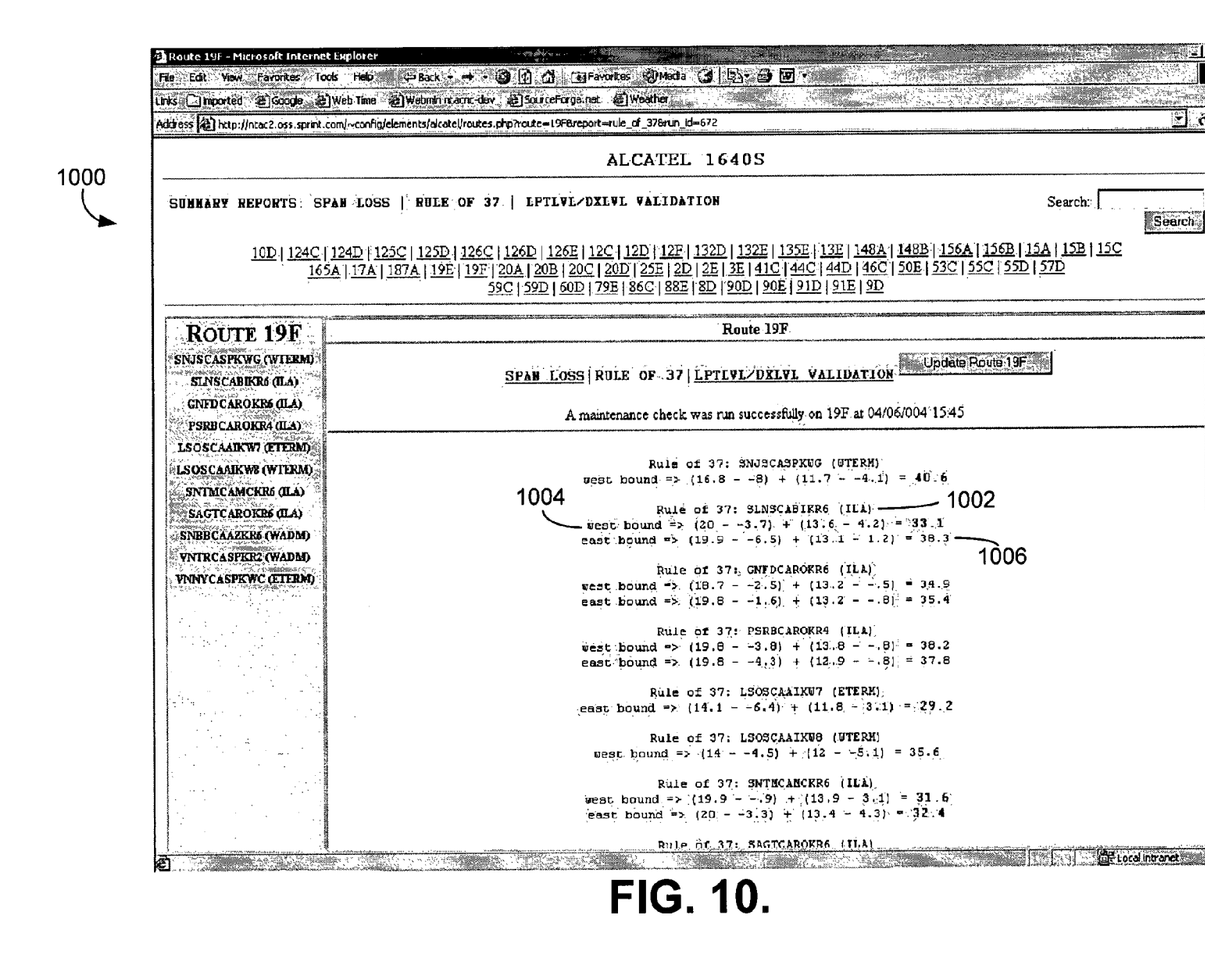
FIG. 10 is an exemplary screenshot of amplification levels of equipment in a telecommunications network in accordance with an embodiment of the present invention.

With reference to FIG. 10, an exemplary screenshot 1000 of the amplification level for nodes in the ALCATEL 1640 system is shown. The amplification levels of nodes on route 19F are shown. For example, ILA node 1002 has a westbound amplification level 1004 of 33.1. It has an eastbound amplification level 1006 of 38.3.

Figure 11:
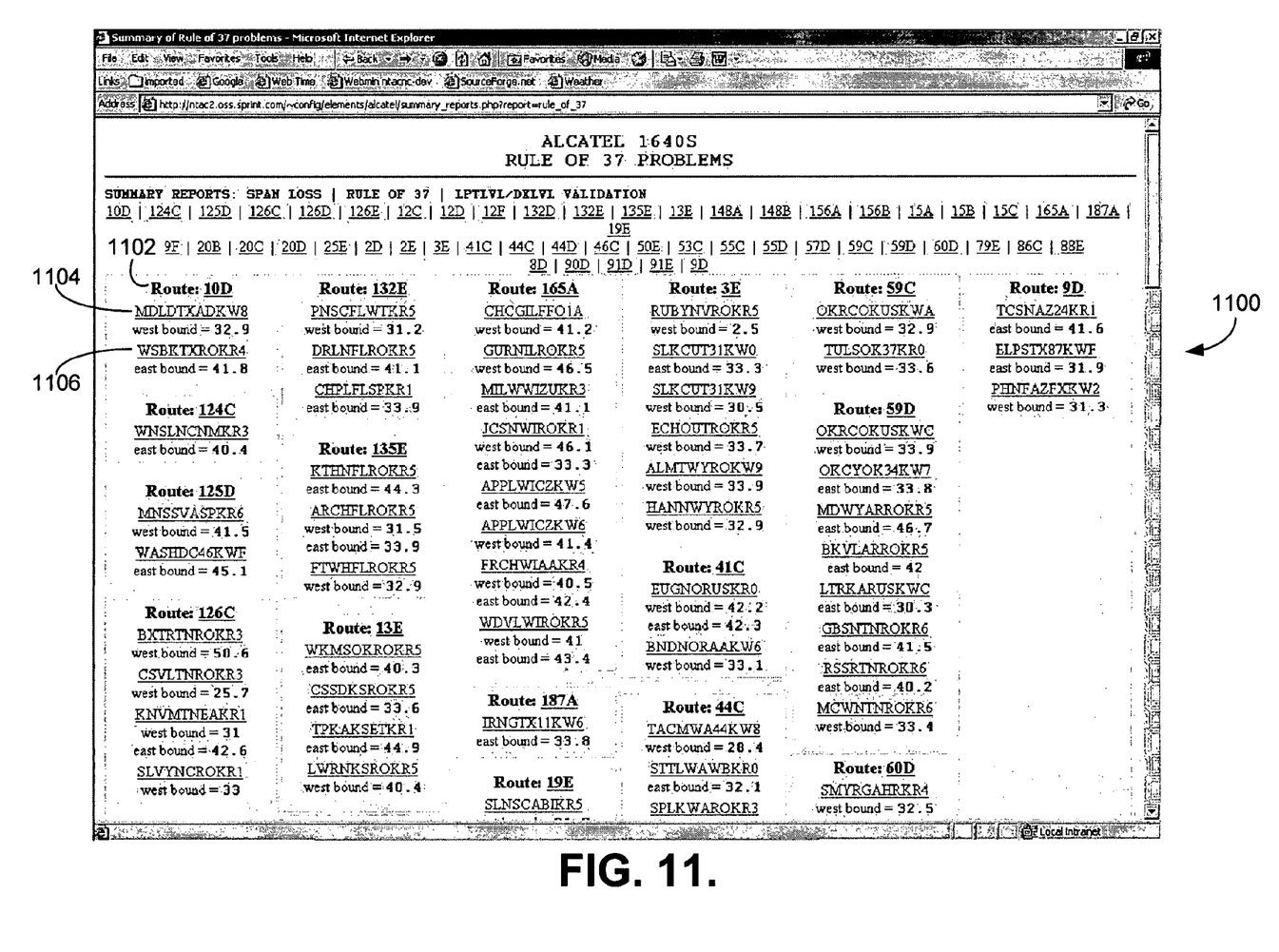
FIG. 11 is an exemplary screenshot of equipment in a telecommunications network that is exhibiting amplification level problems in accordance with an embodiment of the present invention.

Referring next to FIG. 11, an exemplary screenshot of nodes having amplification problems 1100 is shown. For example, on route 10D 1102, node 1104 has a westbound amplification of 32.9. This is not close to the optimal level of amplification needed for the ALCATEL 1640 DWDM nodes. Also, node 1106 has an eastbound amplification of 41.8. This is more than "3" away from 37. As such, these two nodes are listed as having amplification problems.

The present invention relates to a method and system for monitoring nodes in a telecommunications fiber network. The method and system can reprovision alarms and threshold settings of nodes, calculate span loss between two nodes, and determine the amplification level of a node in the network.

Although the invention has been described with reference to embodiments of the invention and the attached drawing figures, it is noted that substitutions may be made and equivalents employed herein without departing from the scope of the invention as recited in the claims. For example, additional steps may be added and other steps omitted without departing from the scope of the invention.

The invention claimed is:

1. A method of determining whether optical fiber amplification of one or more nodes in a fiber network are close to optimal range, the method comprising:
  receiving, at a server, input and output power of a node;
  receiving, at the server, mid-stage input and output power of the node;
  determining, at the server, a first difference between the mid-stage input power and the mid-stage output power;
  determining, at the server, a second difference between the output power and the input power of the node;
  determining, at the server, a fiber amplification level of the node by determining the sum of the first difference and the second difference;
  comparing, at the server, the fiber amplification level of the node to an optimal fiber application level for a type of node;
  determining, at the server, whether the fiber amplification level is near the optimal fiber amplification level;
  displaying, through a user interface communicatively coupled to the server, the fiber amplification level for the node; and
  highlighting, through the user interface communicatively coupled to the server, nodes with fiber amplification levels that are more than a threshold away from the optimal fiber amplification level.

2. The method of claim 1, further comprising determining the output power of the node by:
  receiving channel settings for the node;
  determining what type of node is the node;

determining the number of channels being used by the node based on the channel settings; and determining the output power of the node based on the number of channels being used and the type of node.

3. The method of claim 2, further comprising accessing the entry for the number of channels being used in a database or table.

4. The method of claim 1, further comprising:

automatically performing the method of claim 1 for all nodes in the fiber network on a regular basis.

5. The method of claim 1 further comprising:

receiving a set standard for one or more static thresholds in the node, wherein the static thresholds are configured to a single value everywhere in the fiber network according to the set standard;

determining whether the node has a static threshold settings that is within the set standard for the one or more static thresholds;

if not, providing the set standard for the one or more static thresholds to the node.

6. The method of claim 5, further comprising:

receiving performance data from the first node.

7. The method of claim 6, further comprising:

determining whether the set standard provided to the first node has been accepted.

8. The method of claim 5, further comprising:

automatically performing the method of claim 5 for all nodes in the fiber network on a regular basis.

\* \* \* \* \*